Patented July 12, 1938

2,123,541

UNITED STATES PATENT OFFICE 2,123,541

TREATMENT OF INHIBITORS

Jacque C. Morrell, Chicago, Ill., assignor to Universal Oil Products Company, Chicago, Ill., a corporation of Delaware No Drawing. Application December 20, 1934, Serial No. 758,444

8 Claims. (Cl. 23—239)

This invention relates more particularly to the treatment of inhibitors comprising tars or fractions thereof distilled from various types of woods, particularly hardwoods.

In a more specific sense the invention is concerned with a process of treatment whereby the inhibiting value of these tars or tar fractions when used in unstable gasolines is considerably increased.

The inhibiting materials in use at the present time are of varying physical and chemical properties, some being synthesized chemical compounds and others being of a semi-refined or mixed character. Some are solid at ordinary temperatures and others are liquid and their relative solubilities in hydrocarbons and in water vary considerably, as does their inhibiting potency measured in terms of the retardation in loss of properties which they are able to effect. The deterioration of unstable gasolines such as cracked gasolines under average storage conditions, particularly when there is access of both light and oxygen, is evidenced by the appearance of color, the formation of gum and resinous materials, some of which may ultimately precipitate on prolonged standing, and a loss in antiknock value. Analytical and test work has practically established that these changes are due to a primary formation of peroxides by the addition of an oxygen molecule at the double bonds of conjugated diolefins, these peroxides instigating an extensive series of chain reactions leading to the formation of polymers of the aforesaid diolefins and finally to the polymerization of some monoolefins, along with other reactions of a more or less complicated character whose exact nature is not easily determined.

The effect of inhibitors or antioxidants upon the slowing up of these reactions of deterioration is apparently due to their preferential affinity for the oxygen in the initially-formed peroxides so that the reactions of polymerization, etc., are definitely prevented as long as the inhibitor itself is not entirely consumed. By the proper use of selected inhibitors in quantities varying with the chemical nature of the unstable gasolines, particularly in regard to their diolefin content, it is readily possible at the present time to preserve the desirable properties of gasolines over the normal period of storage in refineries, which may run from approximately two to six months.

Wood tar inhibitors, with the treatment of which the present invention is concerned, have been found to be particularly efficient in arresting the deterioration of cracked gasolines, and the use of these relatively efficient, cheap and readily procurable materials, as disclosed in Patents 1,889,835 and 1,889,836, marked a distinct advance in the inhibiting art. While practically all the oily distillates produced in the distillation of woods have some efficiency in this regard, it has been found that the tars from hardwoods are generally better than those from soft woods and moreover that selected fractions, corresponding generally to what may be termed a heart cut, of the settled tars (usually boiling within the approximate ranges of 425 to 572° F.) have the greatest potency, which normally passes through a very definite maximum at some boiling temperature within this interval.

The yields and quality of inhibitor fractions from wood tars are somewhat limited by the foregoing considerations and also by the fact that they may at times contain, as a result of poorly regulated primary distillation, substantial percentages of heavy pitchy materials which effect somewhat the clarity and the color of gasolines in which the wood tars are used, particularly in cases when the use of per cents of the order of from 0.05 to 0.1 is necessary, as in the case of extensively deteriorated gasolines in which the formation of peroxides has progressed to an undesirable degree.

Furthermore, it is recognized that not all the constituents of wood tars possess anti-oxygenic properties, this being more lacking in the lower-boiling oily wood distillates than in the intermediate cuts mentioned. It has been found that, by the use of the present process, the overall boiling range of primary wood tars is raised and the total percentage of the more valuable inhibiting fractions is materially increased by the various chemical changes occurring therein. The resulting product is also improved in color and other properties.

In one specific embodiment the present invention comprises the treatment of wood tars or fractions thereof, and particularly those fractions boiling below 425 F. with a halide of hydrogen and more particularly with a halogen acid or with a halogen acid and steam in the presence of metals reactive therewith to improve their inhibiting value. The treatments are conducted preferably in substantially vapor phase. The various treatments are not to be considered as exact equivalents.

By the use of the above described process it has been found that the inhibiting potency of wood tar fractions is materially increased as will be shown in later examples. This has been demonstrated by laboratory and storage tests, and particularly by the use of the so-called oxygen bomb test, which is an accelerated test employing oxygen under pressure at 212° F. and which indicates the period of time preceding a measurable rate of oxygen absorption as the "induction period" of a given gasoline. The use of inhibitors extends the induction period and the possession of an induction period of over 240 minutes has been tentatively adopted as indicating a satisfactory gasoline under average conditions of refinery storage. This has been determined by a large amount of experimental work in which induction periods were correlated with results obtained under actual storage conditions. The amount of a given inhibitor necessary for properly stabilizing any gasoline is, in general, inversely proportional to the induction period which it produces, and consequently, when the potency of a wood tar fraction has been increased by the present process, similar relationships hold and there is also less danger in the matter of increased color and a gummy residue which may be left on evaporation when the fuel is employed in internal combustion engine carburetors.

In applying the present process to the treatment of wood tar fractions, the mode of operation is essentially as follows: The fraction to be treated is vaporized either in batch or continuous apparatus employing either shell stills or tube coils and fractionating columns respectively, and the vapors are then passed through beds of granular metals in the presence of halogen acid vapors. Fractionation to rid the vapors of heavy entrained fractions may either precede or follow the treating step (preferably the latter) and subatmospheric pressures may be employed if desired to assure the vapor state in substantially all of the constituents and also to minimize any undesirable decomposition reactions which might occur at the higher temperatures corresponding to atmospheric or superatmospheric pressures. Treatment under reduced pressure or vacuum is preferred.

A number of different metals and their alloys and mixtures may be employed as the stationary contact masses in the treating chambers. Among these may be mentioned particularly those above hydrogen in the electro-chemical series and particularly the so-called heavy metals such as for example: aluminum, manganese, zinc, chromium, iron, cadmium, cobalt, nickel, and tin. These metals react to a varying extent with halogen acids and it is obvious that the treatment may be varied by the choice of halogen acid and the choice of a single metal or a metal mixture so that a number of alternative modes of treatment are possible, without, however, placing them upon an equivalent basis. Good results are obtainable by the use of alloys or mixtures of metals above and below hydrogen. For example the use of commercial brasses and bronzes has been found to be entirely practicable and productive of good treating effects. The metals or their alloys may conveniently be employed in the form of turnings or granules and may be, if desired, mixed with or deposited upon relatively inert materials, generally of a silicious character such as, for example fuller's earth, pumice, crushed firebrick, clays, kieselguhr, etc.

The term halogen acid as used in the present instance, includes hydrochloric acid, hydriodic acid, and hydrobromic acid, the other member of the group, to wit hydrofluoric acid, being too vigorous in its action for the present purposes although it may be employed under some conditions. The acids may be further designated as aqueous solutions of the corresponding hydrogen halides, since moisture is apparently desirable for the furthering of the desired treating reactions and essential to best results and the acids are most conveniently introduced in the form of aqueous solutions, although it is within the scope of the present process to introduce the substantially anhydrous acid vapors along with regulated amounts of steam or water to induce the desired treating effects, or to use the hydrogen halides as such. The last modification is not the exact equivalent to the others. The amount of any one of the halogen acids, for example hydrochloric acid, which is necessary to effect an optimum treating action in the presence of a particular metal or metal mixtures is seldom predictable on a chemical and analytical basis, owing to the complex and variable character of the wood tar fractions which may be subjected to treatment. It is usually best to base large-scale operations upon the results of laboratory or semi-plant scale tests. While the three halogen acids mentioned may be used alternatively with analogous results, it is not intended to infer that their actions are identical or exactly equivalent. The possibility of using any one of the three halogen acids along with a number of different metals or combinations thereof gives a large number of possible treating combinations applicable to different wood tars or wood tar fractions.

The exact nature of the chemical reactions occurring during the treatment are not known although it is believed that reactions of the character of dealkylation or shifting of the alkyl groups, polymerization and others occur.

As a rule, hydrochloric acid is preferable on account of its effective action to produce the results desired, its cheapness and its availability. The amount of acids necessary for effecting treatments is of the order of 10 per cent by weight of the tar fractions, calculated on a basis of the anhydrous hydrogen halide. The acid may at times be used in excess of theoretical requirements in continuous treatments and recirculated.

Down flows are usually preferable in the treating chambers containing the solid contact materials on account of the fact that some liquefaction usually takes place and the liquids flow concurrently with the gas or vapor stream, so that the contact surfaces are kept clean and are effective for longer periods.

Temperatures may be employed, varying from approximately 200 to 600° F., depending upon the character of the tar fraction, the pressure, the acid and contact substance used. In continuous operations, the temperature of the composite vapors will be the approximate mean of the boiling points under a given pressure. For example, in treating a relatively low boiling wood tar fraction whose boiling range is included between the limits of approximately 250 and 425° F. at atmospheric pressure, the mean vapor temperature will be approximately 330 to 340° F. When using a partial vacuum this temperature may be reduced to 300° F. or lower. The invention is not limited, however, to the use of the mean boiling temperature of the vapors but may employ any combination of pressure and superheat to attain the desired results.

The reactions occurring in the treatment of wood tars by the present process are evidently of a very complicated character from a chemical standpoint and are difficult to follow on an analytical basis. It is uniformly observed, however, that the overall boiling range of a particular tar or fraction thereof is raised, that the inhibiting potency of any particular cut is higher and that in the case of fractions boiling below approximately 425° F., or longer boiling range fractions containing substantial percentages of these low-boiling cuts, that the percentage of optimum boiling range fractions from an inhibiting standpoint is increased. On the side of the acid and metals, there is evidently some salt formation by the interaction of the acids and the metallic contact materials, though the extent to which this occurs will vary in each particular instance. It is believed that the metals also function as catalysts for the various reactions.

The following examples showing the results obtained by the application of the present process are illustrative, but the scope of the invention is not to be considered as limited by the particular numerical data given.

*Example I*

In this instance a hardwood tar having 54 per cent by volume boiling within the range of 356–425° F. and 30 percent by volume boiling between 425–572° F., was taken for treatment. The inhibiting value of the light and intermediate fractions were taken as proportional to the increase in induction period in the currently used oxygen bomb test produced by the addition of 0.05 per cent of the fraction to a paraffinic cracked gasoline. In the case of the lower boiling fraction the increase in the time to measurable oxygen absorption was 280 minutes, while that produced by the heavier fraction mentioned was 950 minutes.

The above mentioned tar was vaporized under an absolute pressure of approximately 7 inches of mercury and the vapors were passed downwardly over a mass of brass turnings in a vertical treating tower at a temperature of approximately 350° F. A concentrated hydrochloric acid was injected into the vapors in an amount of about 10 per cent by weight thereof prior to their contacting the brass.

The products from the above treatment were subjected to a distillation and it was found after separation of acid aqueous layer and high boiling range pitches that the percentage of material boiling below 425° F. had been reduced to 28 per cent of the whole tar, while the fraction boiling between 425–572° F. had been increased to 50 per cent on the same basis. The inhibiting values measured by the increased induction periods were 450 and 1400 minutes, respectively.

Both fractions were found to have a much lighter color than the corresponding boiling range cuts from the original tar and improved color stability.

*Example II*

In this instance a fraction of wood tar boiling below 425° F. was treated, the average boiling point being approximately 330° F. at atmospheric pressure. In this case, no vacuum was used but the vapors were treated at their normal boiling temperature by passing them downwardly through a mass of granulated zinc after the injection of about 7 per cent by weight of concentrated aqueous hydrochloric acid. The low boiling fraction before treatment increased the induction period of the paraffinic cracked gasoline by about 310 minutes when used in an amount of 0.03 per cent by weight of the gasoline. As a result of the treatment and the subsequent distillation, the boiling range of the fraction was increased so that 62 per cent boiled within the range of 425–572° F., and the induction period increase produced by 0.03 per cent by weight of the whole treated fraction, constituting 90 per cent of the original, was 600 minutes. Again both color and color stability were improved.

The features and commercial advantages of the present process will be obvious from the foregoing specification and the examples introduced to show numerically the results obtainable in practice, although neither section is to be construed as imposing undue limitations on its generally broad scope.

I claim as my invention:

1. A process for increasing the inhibiting value of the oily distillates of wood tars having anti-oxygenic properties, which comprises treating the distillate in vapor phase with a hydrogen halide in the presence of a metal reactive with the halide.

2. A process for increasing the inhibiting value of the oily distillates of wood tars having anti-oxygenic properties, which comprises treating the distillate in vapor phase with hydrogen chloride in the presence of a metal reactive with the hydrogen chloride.

3. A process for increasing the inhibiting value of the oily distillates of wood tars having anti-oxygenic properties, which comprises treating the distillate in vapor phase with an aqueous hydrogen halide in the presence of a metal above hydrogen in the electro-chemical series.

4. A process for increasing the inhibiting value of the oily distillates of wood tars having anti-oxygenic properties, which comprises treating the distillate in vapor phase with aqueous hydrogen chloride in the presence of a metal above hydrogen in the electro-chemical series.

5. A process for increasing the inhibiting value of the oily distillates of wood tars having anti-oxygenic properties, which comprises treating the distillate in vapor phase with aqueous hydrogen chloride in the presence of a metallic contact mass comprising zinc.

6. A process for increasing the inhibiting value of the oily distillates of wood tars having anti-oxygenic properties, which comprises treating the distillate in vapor phase with hydrochloric acid in the presence of zinc.

7. A process for increasing the inhibiting value of the oily distillates, boiling below 425° F., of wood tars having anti-oxygenic properties, which comprises treating the distillate boiling below 425° F., in vapor phase, with aqueous hydrogen chloride in the presence of a metallic contact mass comprising zinc.

8. A process for producing inhibitors from hardwood tars which comprises distilling the tar, contacting resultant vapors with hydrochloric acid in the presence of a metallic contact mass comprising zinc, condensing the thus treated vapors and recovering an oily distillate from the resultant condensate.

JACQUE C. MORRELL.